United States Patent [19]
Mehl et al.

[11] 3,911,080
[45] Oct. 7, 1975

[54] AIR POLLUTION CONTROL

[75] Inventors: Wolfgang Mehl; Kurt Halfar, both of Geneva, Switzerland

[73] Assignee: H. Dudley Wright, Geneva, Switzerland

[22] Filed: Sept. 7, 1973

[21] Appl. No.: 395,013

Related U.S. Application Data

[63] Continuation of Ser. No. 179,375, Sept. 10, 1971, abandoned.

[52] U.S. Cl. .................... 423/210; 55/16; 55/158; 423/220; 423/224; 423/242; 423/245; 204/234
[51] Int. Cl.² ........................................ B01D 53/34
[58] Field of Search .......... 423/210, 220, 224, 242, 423/245; 55/16, 97, 158, 159; 204/83, 103, 131, 234

[56] References Cited
UNITED STATES PATENTS

| | | | |
|---|---|---|---|
| 3,335,545 | 8/1967 | Robb et al. | 55/158 X |
| 3,447,286 | 6/1969 | Dounoucos | 55/16 |
| 3,485,743 | 12/1969 | Mayland et al. | 204/234 |
| 3,503,186 | 3/1970 | Ward | 55/16 |
| 3,819,806 | 6/1974 | Ward et al. | 423/232 |

*Primary Examiner*—Earl C. Thomas
*Attorney, Agent, or Firm*—Kenyon & Kenyon Reilly Carr & Chapin

[57] ABSTRACT

Air containing a pollutant, such as hydrogen sulfide, sulfur dioxide or an organic compound such as a mercaptan, an aldehyde, an amine, an alcohol, and the like, is contacted with a liquid impermeable module or cell having as a surface thereof a liquid-impermeable and gas-permeable membrane and containing an agent which reacts with the pollutant to convert it to one or more innocuous substances, whereby the pollutant passes through the membrane and is reacted with the agent, thus reducing the concentration of the pollutant in the air. The membrane is desirably comprised of an inorganic powder which may serve as an absorbent, preferably powdered activated carbon, dispersed in an inert, hydrophobic polymer such as polytetrafluoroethylene, and the reactive agent is desirably an aqueous solution of an oxidizing agent, preferably hydrogen peroxide. The module is preferably provided with means to regenerate the reactive agent which, in the case of aqueous solutions of oxidizing agents, can be an electrolytic cell in which the spent oxidizing agent is regenerated by electrolytic technique.

14 Claims, 4 Drawing Figures

INVENTOR.
WOLFGANG MEHL
BY KURT HALFAR
ATTORNEYS

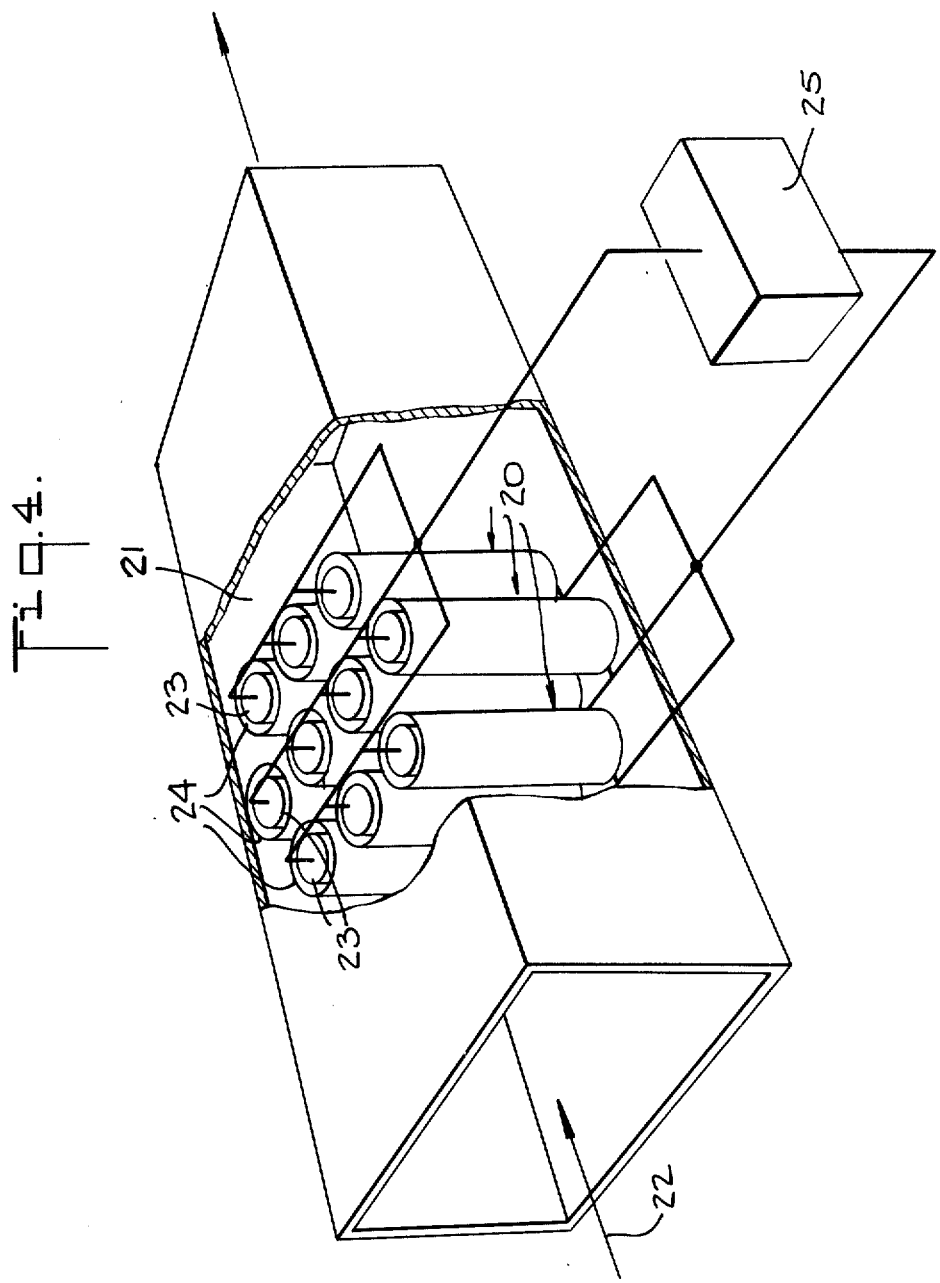

AIR POLLUTION CONTROL

This is a continuation of application Ser. No. 179,375, filed Sept. 10, 1971, and now abandoned.

DISCLOSURE

This invention relates to an apparatus and a method for air pollution control. More particularly, the present invention is concerned with an apparatus and method for removing pollutants from air or similar gases such as industrial stack gases which contain predominantly nitrogen and oxygen.

Off gases from various industrial processes generally contain numerous pollutants. Although a wide variety of methods for removing such pollutants have been proposed, they all are based upon one of two basic concepts: (1) chemical conversion of the pollutant to a harmless substance; or (2) adsorption of the pollutant on a solid such as charcoal.

The majority of the chemical processes for purifying air are oxidation processes which depend upon two basic techniques, combustion or scrubbing with an oxidizing agent dissolved in a solvent, usually water. Although combustion is a very efficient method for the removal of air pollutants, it generally is uneconomical due to the high cost of supplying the necessary heat and/or catalysts. As a result, considerable effort has been devoted to the development of scrubbers for contacting air with a solution or dispersion of a reactant (oxidant) for the impurity. These devices are fairly complicated and bulky, typically treating an air volume equal to from 1000 to 2000 times the volume of the scrubber per hour. Moreover, while scrubbers are generally useful for large scale operations in which the treated gas stream is exhausted to the atmosphere, they cannot be used for small scale operations, especially where the air is recirculated. This is because it is difficult to prevent evaporation of the wash solvent into the treated air, and in recirculation systems undesirably high concentrations of solvent vapors in the air may result.

Adsorption of the pollutants from gas streams is useful only when the pollutant is valuable and should be recovered. In many cases, however, the pollutants are not valuable and, since they passivate the adsorbent, a reactivation step is generally required. Upon reactivation of the adsorbent, the pollutant is regenerated in a concentrated form and must be degraded in a suitable fashion. As a result, adsorption processes are extremely expensive and cannot be justified except in rare cases.

It is an object of this invention to provide a simple means for removing pollutants from air streams.

It is a further object of this invention to provide a means for economically removing a variety of pollutants from air streams.

A further object of this invention is to provide a means for removing pollutants from air streams while avoiding generation of solvent vapors into the treated air streams.

Still another object of this invention is to provide a means for removing pollutants from air which is useful on both large and small scale.

Still other objects of this invention will be evident from the ensuing specification accompanying drawings and appended claims.

In accordance with this invention there is provided a liquid-impermeable but gas-permeable chamber or module containing selected reactant for the pollutant intended to be removed from the air stream. The reactant is desirably in aqueous solution and the chamber is desirably provided with means for regenerating the reactant for the pollutant. Polluted air is contacted with the chamber and diffuses through a wall thereof, allowing the pollutant to react with the reactant and be removed from the air.

By the term "polluted air", as employed herein, is meant air or any similar gas comprised predominantly of nitrogen and oxygen, and which contains one or more undesired gaseous pollutants. Gases of this type include air and off gases from a variety of sources, including industrial stack gases, exhaust gases from combustion processes and the like. The pollutants can be organic or inorganic in nature. Illustrative of the more common pollutants are hydrogen sulfide, sulfur dioxide, aldehydes such as formaldehyde, acetaldehyde, acrolein and furfural, mercaptans such as methylmercaptan, organic sulfides such as dimethyl sulfide, amines such as ethylamine, diethylamine, triethylamine, aniline and pyridine, and alcohols such as methanol and phenol, and the like.

The present invention is further illustrated by the accompanying drawing, of which:

FIG. 4 illustrates an arrangement of modules of the type illustrated by FIG. 2 in an air cleaning device.

Figure 1:
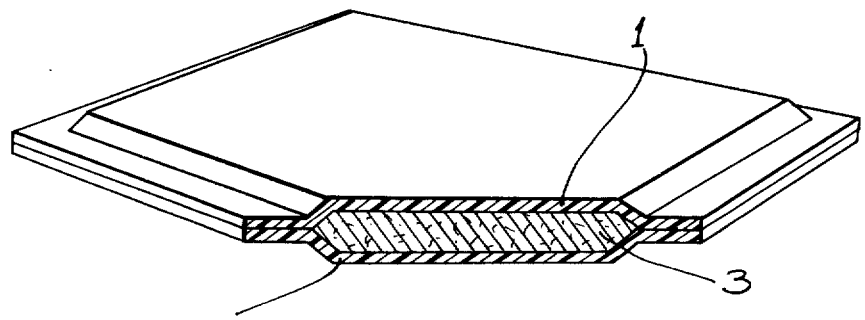
FIG. 1 illustrates one embodiment of a module contemplated by the present invention.

With reference to FIG. 1, in its simplest form, the module contemplated by the present invention comprises a sandwich-like structure of semi-permeable membranes 1 and 2 sealed at their outer edges enclosing reactant 3 for converting pollutants to innocuous substances. Reactant 3 is preferably in the form of an aqueous solution which desirably is deposited on a suitable fibrous or non-fibrous support. Modules of this type are readily formed by impregnating the support with the aqueous reactant, interposing the impregnated support between two semipermeable membranes and then sealing the membranes at their edges by known techniques to provide a liquid-tight seal.

Although the module is shown as a rectangular laminar structure, both of whose walls are semi-permeable membranes, it is clear that various modifications can be employed. Thus, both the geometry of the module and the portion of the outer surface which is semi-permeable may be varied. For example the module may be a circular laminate or it may be in the form of a geometric solid such as a cube, a cylinder or other suitable construction having one or more walls, or even a portion of one or more walls, formed from a semi-permeable membrane. It is desirable, however, that as much of the outer surface of the module as possible be a semi-permeable membrane to maximize the contact area with polluted air.

In use, the module of FIG. 1 is contacted with polluted air, which diffuses through membranes 1 and 2 and into contact with reactant 3, where the pollutant reacts with the reactant and is converted into innocuous substances. As a result, a concentration gradient of pollutant is established across membranes 1 and 2, causing a reduction in the concentration of the pollutant in the air. Contact of the air with the module is maintained for a time sufficient to effect a desired reduction in the concentration of the pollutant. Alternatively, the polluted air is contacted with a plurality of modules, the total contact time being sufficient to achieve the desired reduction in pollutant concentration.

By the term "semi-permeable membrane," as used herein, is meant a membrane which is permeable to gases and vapors but is impermeable to liquids. Many membranes of this type are known to the art, and their composition forms no part of this invention. When aqueous solutions of reactant are employed, these membranes are porous and hydrophobic, with the pore sizes being such that gas molecules can pass through the membrane and yet, because of the hydrophobic nature of the membrane, the aqueous medium will not pass through. It is permissible, and in some cases desirable, that some pores be large enough to permit penetration of the aqueous medium, provided they do not extend all the way through the membrane, but rather connect with pores of smaller diameter. In this way, contact of the air and the aqueous reactant solution is effected within the body of the membrane.

Preferred membranes comprise an inert inorganic powder, which desirable is an adsorbent for the pollutants being removed from the air, dispersed in a hydrophobic polymer which is solid under the conditions of use in the module and inert to the gas stream components and the reactant. Suitable inorganic materials include activated carbon, graphite, ceria, zinc oxide, alumina or magnesium oxide. Suitable polymers include polyethylene, polypropylene, polyamides, e.g. nylon, and polymers of halogenated, preferably fluorinated, ethylene or propylene, such as homopolymers of vinylidene fluoride, tetrafluoroethylene, monochlorotrifluoroethylene, hexafluoropropylene and the like. Membranes formed of graphite or activated carbon and polytetrafluoroethylene are preferred.

The adsorbents are desirably finely divided, high surface area materials. Materials having particle sizes in the range of from about 10 to about 500 millimicrons and surface areas in the range of from about 10 to about 100 square meters per gram are preferred.

The ratio of inorganic solid to polymer in these membranes is not narrowly critical, and will depend upon the particular membrane characteristics desired. In general, the porosity of the membrane increases and the tensile strength of the membrane decreases with increasing inorganic solid content, and useful membranes can contain from about 5 to about 90 weight per cent polymer and from about 95 to about 10 weight per cent inorganic solid. Membranes having an optimum balance of porosity and strength are obtained at approximately equal parts by weight of inorganic solid and polymer, i.e., from about 45 to 55 weight per cent polymer and from about 55 to about 45 weight per cent solid.

The structural strength of these membranes may be enhanced by incorporating fibrous materials, such as glass or fibers, within the membrane.

The preferred membrane is formed by mixing the finely divided inorganic solid and finely divided particles (having particle size of 10 to 500 millimicrons) of polymer together to form a homogeneous mixture and then sintering the polymer particles to form the porous membrane, desirably having a thickness of from about 0.1 to about 2 mm, and preferably from about 0.4 to about 0.6 mm.

In a preferred technique the inorganic solid, e.g. graphite or activated carbon, is mixed with an aqueous dispersion of the polymer to form a homogeneous slurry. The slurry is then formed into a sheet and the sheet is heated to drive off the water and sinter the polymer. For example, when employing a commercially available emulsion of 60 per cent polytetrafluoroethylene in water (Teflon 30N), a slurry containing equal parts of inorganic powder and polymer on a dry basis is formed at room temperature and then rolled into a sheet. The sheet is desirably subjected to sufficient pressure to expel some of the water. Pressures of from about 1 to about 20 kilograms per square centimeter are useful, with pressures at the upper end of this range (i.e., above about 10 kg/sq.cm.) being preferred.

A second rolling process is then performed at moderately elevated temperatures, e.g., at temperatures of from about 80°C. to 120°C., and preferably at about 90°C., to drive off additional water. Finally the sheet is heated at temperatures of from about 100°C. to about 150°C., preferably about 120°C., to complete the drying process, and is then briefly subjected to temperatures of from about 325°C. to about 375°C., preferably about 350°C., to fuse or sinter the polymer particles. The resulting product is a tough, flexible sheet which has a density in the range of from about 0.4 to about 0.8 grams per cubic centimeter which is permeable to gases but is impermeable to water.

Membranes of this preferred type operate in two ways:

1. They contain and provide a contact interface for a suitable reactant which degrades the pollutant; and
2. The high surface area filling material of the membrane adsorbs the pollutant as a first step in the treatment process. Adsorption is followed by degradation of the pollutant with a suitable reactant, resulting in reactivation of the membrane for further adsorption of the pollutant from the air stream.

The pollutant may thus penetrate the membrane through the pores of the membrane and interact immediately with the reactant, or it may be first adsorbed by the inorganic solid and then react with the reactant. This system thus combines the fast response time of adsorption processes with the degrading power of a chemical treatment, and yet is extremely simple to make and use.

The particular reactant which is employed in accordance with this invention will depend upon the impurity or impurities to be removed from the gas stream and the reaction desired. Ordinarily the reactant will be an oxidizing agent or a reducing agent for the pollutant, with oxidizing agents being preferred. It is also desirable that the reactant be regenerable; e.g., that the reduced form of an oxidant by oxidizable back to the oxidant.

Reactants meeting the criteria of reactivity to yield innocuous substances, solubility in water and regenerability can be readily determined by those of ordinary skill in the art. Illustrative oxidizing agents include ozone, hydrogen peroxide, hypochlorous acid and its salts, chlorous acid and its salts, chloric acid and its salts, perchloric acid and its salts, quinone, chlorine dioxide, chlorine trioxide, chlorine, bromine hypobromic acid, bromic acid salts, hypoiodous acid, permanganate salts, manganic salts, cobaltic salts, ferric salts, thallic salts, ceric salts, bichromate salts, chloroiridic salts, vanadate [$V(OH)_4^+$ and $VO_2^+$] salts and the like.

These oxidizing agents are desirably employed in the form of aqueous solutions. The concentration of the oxidizing agents in the solution is not critical, provided the amount is sufficient to provide the desired activity over a desired time span, and can vary from about 1 weight per cent or even less up to the solubility limit of the particular agent.

As noted above, the aqueous reactant solution is preferably adsorbed on or absorbed in a suitable fibrous or nonfibrous inert support. A preferred support material is glass fibers, which can be in the form of batting, roving and the like. Other materials, such as silica gel, zeolites, alumina and the like can also be employed.

In a preferred modification of the module of FIG. 1, there is provided means for regenerating the reactant, which means may be internal or external of the module. The particular means employed obviously will depend upon the reactant employed, as well as a variety of technical and economic considerations. When the reactant is an oxidizing agent, however, it is preferred that electrochemical means be employed to regenerate spent oxidizing agents.

Figure 2:
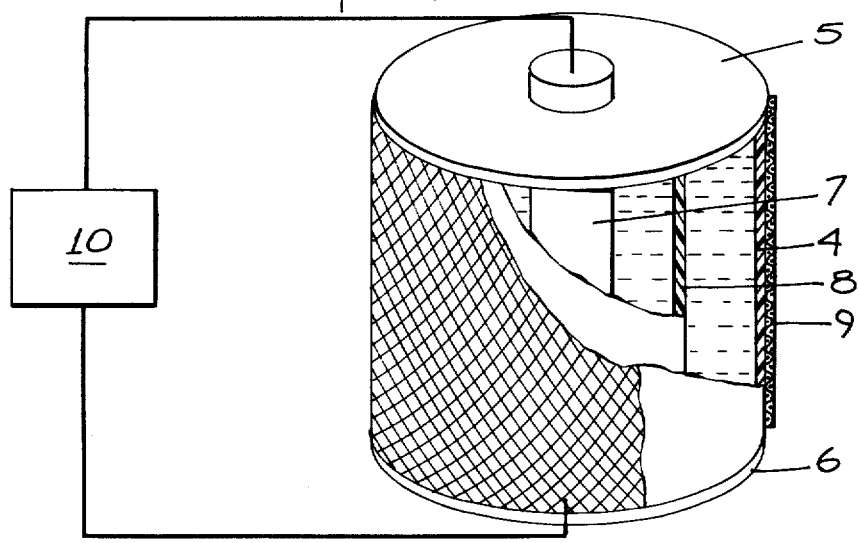
FIG. 2 illustrates a preferred embodiment of a module contemplated by this invention including means for internal regeneration of the reactant.

An embodiment of the module of this invention having internal electrochemical regenerating means is illustrated in FIG. 2. In this embodiment, the module comprises cylindrical, electrically-conductive semipermeable membrane 4, which serves as one electrode for the module.

The ends of membrane 4 are sealed by nonconductive impermeable end members 5 and 6. The module is also provided with axially mounted electrode 7 and annular separator 8 between and spaced from cylindrical electrode 4 and axial electrode 7. When the reactant is an oxidizing agent which can be regenerated by cathodic reduction of oxygen, e.g. hydrogen peroxide, the electrode 4 serves as a cathode and axial electrode 7 serves as an anode.

In this embodiment, membrane 4 must be electrically conductive. Suitable membranes are obtained by incorporating an electrically-conductive, finely-divided solid in the membrane. Finely divided graphite or activated carbon is preferred for this purpose, since they also are useful as the above-mentioned inorganic adsorbent fillers.

The remaining module elements can be formed from materials that are well known to the art. For example, the anode can be formed of any suitable inert, electrically-conductive substance, such as nickel, coated with a layer of conducting nickel oxide or other suitable metal, the separator is of any suitable porous material through which electricity can pass with a minimum of mass transport, such as porous porcelain, and the end members can be any chemically inert, nonconductive, physically strong material.

Although membrane 4 is electrically conductive, and electrical contact can be made in any suitable manner, it is preferred to make electrical contact to the membrane with a porous, electrically conductive material 9. Suitable contact members include metal gauzes, screens and the like, porous graphite or other porous members which conduct electricity.

The module of FIG. 2 is also provided with an aqueous electrolyte, which contains the dissolved reactant. The composition of the electrolyte solution is not critical to this invention, provided it has a suitable conductivity and the desired reactions of reactant with pollutant and regeneration of the reactant can proceed.

In use, polluted air is allowed to contact the module as before and a suitable power source 10 is connected across electrodes 4 and 7 to generate an electric current in the module, the current being adjusted to regenerate the reactant at the same rate it is consumed by reaction with the pollutant. Because a gas, either oxygen or hydrogen, is generated, the module must, of course, be provided with means, not shown, to remove the gas.

A particularly preferred electrolyte solution comprises an aqueous alkaline solution of hydrogen peroxide. Such a solution desirably comprises an alkali metal, e.g. sodium or potassium, hydroxide and/or carbonate in amounts sufficient to provide the desired conductivity, and hydrogen peroxide, a portion of which may be in the form of its monoalkali metal (e.g. monosodium or monopotassium) salt, in an amount sufficient to react with an oxidizable pollutant and remove it from the air stream at a desired rate. Suitable solutions of this character may be obtained through the techniques disclosed in copending U.S. application Ser. No. 149,194 filed June 2, 1971.

In a module employing an electrolyte of this type, which contains an oxidant which is regenerable by cathodic reduction of oxygen, membrane 4 serves as the cathode and axial electrode 7 serves as the anode. Oxygen from the air also diffuses through membrane 4 and into contact with the electrolyte, where it is reduced through electrochemical action to regenerate the hydrogen peroxide.

Figure 3:
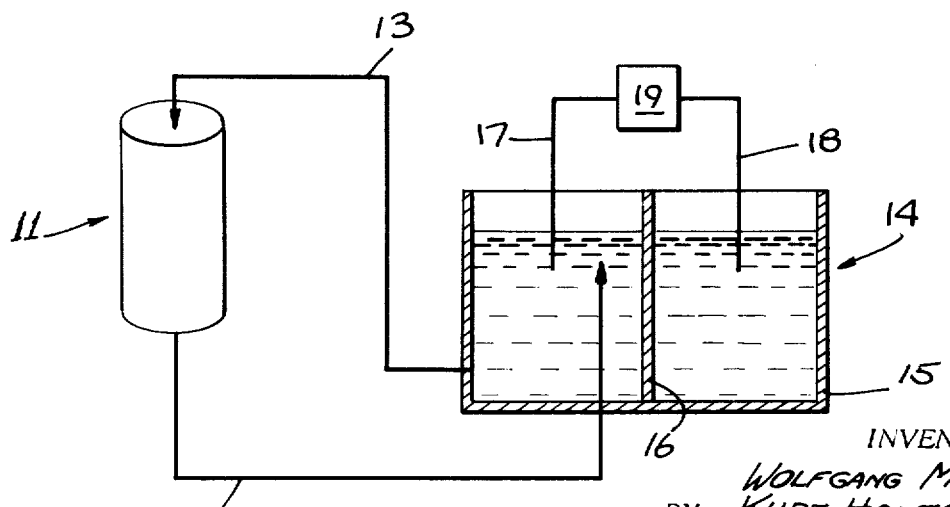
FIG. 3 illustrates a more preferred embodiment including external means for regeneration of the reactant.

In the embodiment illustrated by FIG. 3, the module is provided with external means for regenerating the reactant. Again, this regeneration means is desirably in electrochemical cell. In this form module 11 is connected via lines 12 and 13 to electrolytic cell 14 comprising container 15, separator 16, and electrodes 17 and 18 connected to power source 19. In this embodiment aqueous reactant solution is drawn from module 11, either intermittently or continuously, through line 12 and charged to one electrode compartment of cell 14 for regeneration of the reactant. The regenerated reactant solution is then recycled to module 11 via line 13.

The modules may be employed singly, or a plurality of the modules may be employed. FIG. 4 illustrates the use of a plurality of modules of the type shown in FIG. 2 in an air cleaning device. As shown, a plurality of modules 20 are positioned in an air duct 21 in rows, with the modules of one row being offset with respect to the modules of another row to ensure maximum contact of air passing through duct 21 (in the direction of arrow 22). The modules' electrodes 23 and 24 are connected (in parallel or series) to power source 25, with the current being adjusted to effect adequate regeneration of the reactant. The number and spacing of modules 20 is adjusted to allow sufficient contact of the polluted air with the modules to effect a desired reduction in the concentration of the pollutant in the air. The treated air then passes out through duct 21.

The following examples are illustrative:

EXAMPLE 1

Powdered activated carbon is admixed with an aqueous suspension of polytetrafluoroethylene (such as Teflon 30N sold by DuPont de Nemours & Co.). The resulting mixture is extruded into a film and the film is heated to drive off the water and form a dry semipermeable membrane comprising 50 parts by weight of carbon and 50 parts by weight polytetrafluoroethylene. The thus produced membrane is employed as the wall of a cylindrical cell as illustrated by FIG. 2, having a diameter of 4.5 cm. and a height of 25 cm. The cell is also provided with a porcelain separator and a nickel anode coated with nickel oxide doped with lithium. The cell is inserted into a hermetically sealed plastic box with a total volume of 600 ml. into which various amounts of pollutants are introduced, after which their removal is studied by periodically extracting small air volumes from the box and analyzing the samples.

After about 1800 mg. $H_2S$ are admitted to the box (in the absence of electrolyte in the electrochemical cell) the carbon membrane and the walls of the cell appear saturated with $H_2S$ and the concentration of the gas in the bulk of the box settles to a steady state value equivalent to 1 mg/10ml. which is roughly constant for at least 1 hour. When the same experiment is repeated after the electrochemical cell is filled with an electrolyte comprising a 5 N solution of potassium hydroxide and hydrogen peroxide has been generated in the outer annulus by cathodic reduction of oxygen as described in copending application Ser. No. 149,194, filed June 2, 1971, all of the hydrogen sulfide is found to be removed from the air in ten minutes. When the electrolyte is 1 N KOH, the $H_2S$ is oxidized to $H_2SO_4$, which reacts with the KOH to form $K_2SO_4$ and $H_2O$. Similar results are obtained with the following compounds, which are representative of common types of air pollutants: formaldehyde, acetaldehyde, methyl mercaptan, dimethylsulfide, ethylamine, aniline, diethylamine, triethylamine, acrolein, furfural, phenol and pyridine.

EXAMPLE 2

A membrane formed as described in Example 1 forms the outside of a cell as illustrated in FIG. 3, through which a solution containing hydrogen peroxide (which is generated in a device described in application Ser. No. 149,194 filed June 2, 1971) is transferred.

After leaving the cell the solution is passed through a vessel in which the electrolyte is treated for changes in pH, removal of possible debris etc. before returning to the peroxide generator. The closed loop process allows for very long operation times of the pollution correction device.

EXAMPLE 3

Powdered graphite is admixed with an aqueous suspension of polytetrafluoroethylene (such as Teflon 30N sold by DuPont de Nemours & Co.). The resulting mixture is extruded into a film and the film is heated to drive off the water and form a dry semipermeable membrane comprising 50 parts by weight of graphite and 50 parts by weight polytetrafluoroethylene. A glass fiber material having adsorbed thereon a solution of 0.35 weight per cent ceric sulfate in water is sealed between two of the thus produced membranes to provide a module having a total thickness of about 6 mm and a total surface area of 750 $cm^2$. The resulting module is placed in a hermetically sealed container having a volume of 6000 $cm^3$ and then 56 ml of sulfur dioxide is injected into the container to yield a concentration of about $9 \times 10^3$ ppm. Samples of the air in the container are extracted periodically and analyzed for $SO_2$ content. After 3 minutes all sulfur dioxide is removed from the air. In a similar experiment, except that the ceric sulfate is omitted, approximately 90 per cent of the sulfur dioxide remains after 30 minutes.

EXAMPLE 4

The experiment reported in Example 1 is repeated, except that 45 ml of hydrogen sulfide is substituted for the sulfur dioxide to give a concentration of about $7.5 \times 10^3$ ppm. In this case all hydrogen sulfide is removed after 18 minutes.

What is claimed is:

1. A method for removing a pollutant selected from the group consisting of hydrogen sulfide, sulfur dioxide, aldehydes, mercaptans, organic sulfides, amines and alcohols from polluted air comprising bringing air containing said pollutant into contact with a gas-permeable and liquid impermeable membrane comprising an inert, finely divided, inorganic solid selected from the group consisting of activated carbon, graphite, ceria, zinc oxide, alumina and magnesium oxide dispersed throughout a solid, inert, hydrophobic polymer, allowing said pollutant to pass from said air through said membrane and into contact with an aqueous solution containing a reactant for said pollutant selected from the group consisting of an oxidizing agent or a reducing agent for said pollutant and allowing reaction to occur between said reactant and said pollutant, the period of contact of said air with said membrane being sufficient to reduce the concentration of said pollutant in said air, and thereafter withdrawing said air from contact with said membrane.

2. A method according to claim 1 wherein said reactant is an oxidant for said pollutant.

3. A method according to claim 2 wherein said oxidant is a member selected from the group consisting of ozone, hydrogen peroxide, hypochlorous acid and its salts, chlorous acid and its salts, chloric acid and its salts, perchloric acid and its salts, quinone, chlorine dioxide, chlorine trioxide, chlorine, bromine, hypobromic acid, bromic acid salts, hypoiodous acid, permanganate salts, manganic salts, cobaltic salts, ferric salts, thallic salts, ceric salts, bichromate salts, chloroiridic salts and vanadate [$V(OH)_4^+$ and $V_2115$ ] salts.

4. A method according to claim 3 wherein said oxidant is hydrogen peroxide.

5. A method according to claim 3 wherein said oxidant is ceric sulfate.

6. A method according to claim 2 in which said solution is a catholyte or anolyte for an electrolytic cell, including the step of passing a current between the anode and cathode of said cell to regenerate said oxidant.

7. A method according to claim 5 wherein hydrogen peroxide is said oxidant.

8. A method according to claim 1 wherein said semipermeable membrane comprises a member selected from the group consisting of activated carbon and graphite dispersed in polytetrafluoroethylene.

9. A method for removing a pollutant from polluted air comprising bringing air containing said pollutant into contact with gas-permeable and liquid impermeable membrane comprising an inert, finely divided, inorganic solid selected from the group consisting of activated carbon, graphite, ceria, zinc oxide, alumina and magnesium oxide dispersed throughout a solid, inert, hydrophobic polymer, allowing said pollutant to pass from said air through said membrane and into contact with an aqueous solution containing an oxidant for said pollutant selected from the group consisting of ozone, hydrogen peroxide, hypochlorous acid and its salts, chlorous acid and its salts, chloric acid and its salts, perchloric acid and its salts, quinone, chlorine dioxide, chlorine trioxide, chlorine, bromine, hypobromic acid, bromic acid salts, hypoiodous acid, permanganate salts, manganic salts, cobaltic salts, ferric salts, thallic salts, ceric salts, bichromate salts, chloroiridic salts, and vanadate [$V(OH)_4^+$ and $VO_2^+$] salts, allowing reaction to occur between said oxidant and said pollutant, the period of contact of said air with said membrane being sufficient to reduce the concentration of said pollutant in said air, and thereafter withdrawing said air from contact with said membrane.

10. A method according to claim 9 wherein said oxidant is hydrogen peroxide.

11. A method according to claim 10 wherein said oxidant is ceric sulfate.

12. A method according to claim 9 in which said solution is a catholyte or anolyte for an electrolytic cell, including the step of passing a current between the anode and cathode of said cell to regenerate said oxidant.

13. A method according to claim 12 wherein hydrogen peroxide is said oxidant.

14. A method according to claim 9 wherein said semipermeable membrane comprises a member selected from the group consisting of activated carbon and graphite dispersed in polytetrafluoroethylene.

* * * * *

UNITED STATES PATENT OFFICE
CERTIFICATE OF CORRECTION

Patent No. 3,911,080　　　　　　　　Dated October 7, 1975

Inventor(s) Wolfgang Mehl; Kurt Halfar

It is certified that error appears in the above-identified patent and that said Letters Patent are hereby corrected as shown below:

Column 8, line 44, "$V_2 115$" should read --$VO_2^+$--.

*Signed and Sealed this* sixteenth *Day of* December 1975

[SEAL]

Attest:

RUTH C. MASON
*Attesting Officer*

C. MARSHALL DANN
*Commissioner of Patents and Trademarks*